United States Patent [19]

Bulland

[11] 4,081,814

[45] Mar. 28, 1978

[54] CAMERA FLASH BRACKET

[76] Inventor: Julian A. Bulland, 469 Pine St., San Francisco, Calif. 94104

[21] Appl. No.: 718,736

[22] Filed: Aug. 30, 1976

Related U.S. Application Data

[63] Continuation-in-part of Ser. No. 561,083, Apr. 17, 1975, abandoned.

[51] Int. Cl.² .......................................... G03B 17/00
[52] U.S. Cl. ..................... 354/293; 354/82; 248/187
[58] Field of Search .................. 354/81, 82, 293, 294, 354/126; 240/1.3; 248/223.1, 223.2, 360, 176, 187

[56] References Cited

U.S. PATENT DOCUMENTS

| | | | |
|---|---|---|---|
| 2,483,711 | 10/1949 | Roos | 354/293 |
| 2,589,892 | 3/1952 | Suzukawa | 248/187 |
| 2,966,107 | 12/1960 | Sanderson | 248/187 |
| 3,550,519 | 12/1970 | Lewis | 240/1.3 |
| 3,731,897 | 5/1973 | Price | 354/293 |
| 3,855,602 | 12/1974 | Hoos | 354/293 |
| 3,893,145 | 7/1975 | King | 354/293 |
| 3,984,855 | 10/1976 | Baczynsky | 354/293 |

Primary Examiner—L. T. Hix
Assistant Examiner—Alan Mathews
Attorney, Agent, or Firm—Townsend and Townsend

[57] ABSTRACT

A camera grip is disclosed which comprises a bracket for supporting at least one camera, a handle for supporting accessories, and means for mounting the bracket to the handle such that the camera supporting bracket may be quickly secured to and released from the handle in a plurality of configurations and orientations. In the preferred embodiment, the handle includes a relatively thin, U-shaped strut provided with keyholes and a latch, and the camera support bracket comprises an L-shaped portion provided with capped studs on the outside of each arm which mate with the strut keyholes. The bracket may support a camera in the crook of the L-shaped portion. The capped studs interlock with the strut and are secured by a latch when the capped studs engage the keyholes. The bracket may be quickly removed from the strut by release of the latch, which is operable by a simple motion of the grip-supporting hand. The handle also includes a telescopic shaft which may be used as a tripod or for the support of a flash attachment or the like.

11 Claims, 5 Drawing Figures

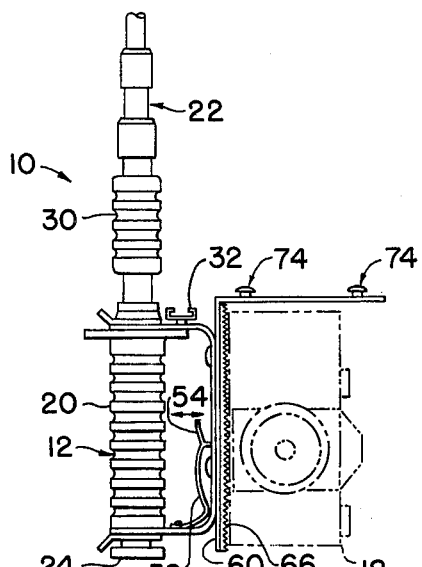
FIG._2.
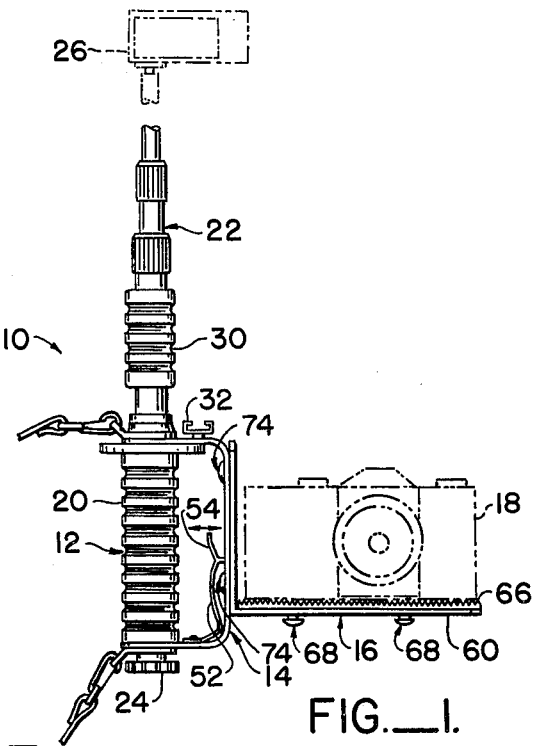
FIG._1.
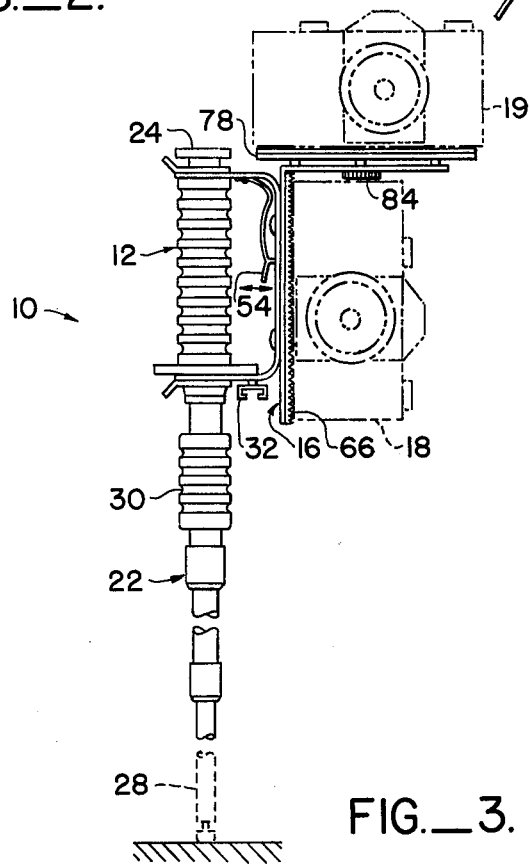
FIG._3.

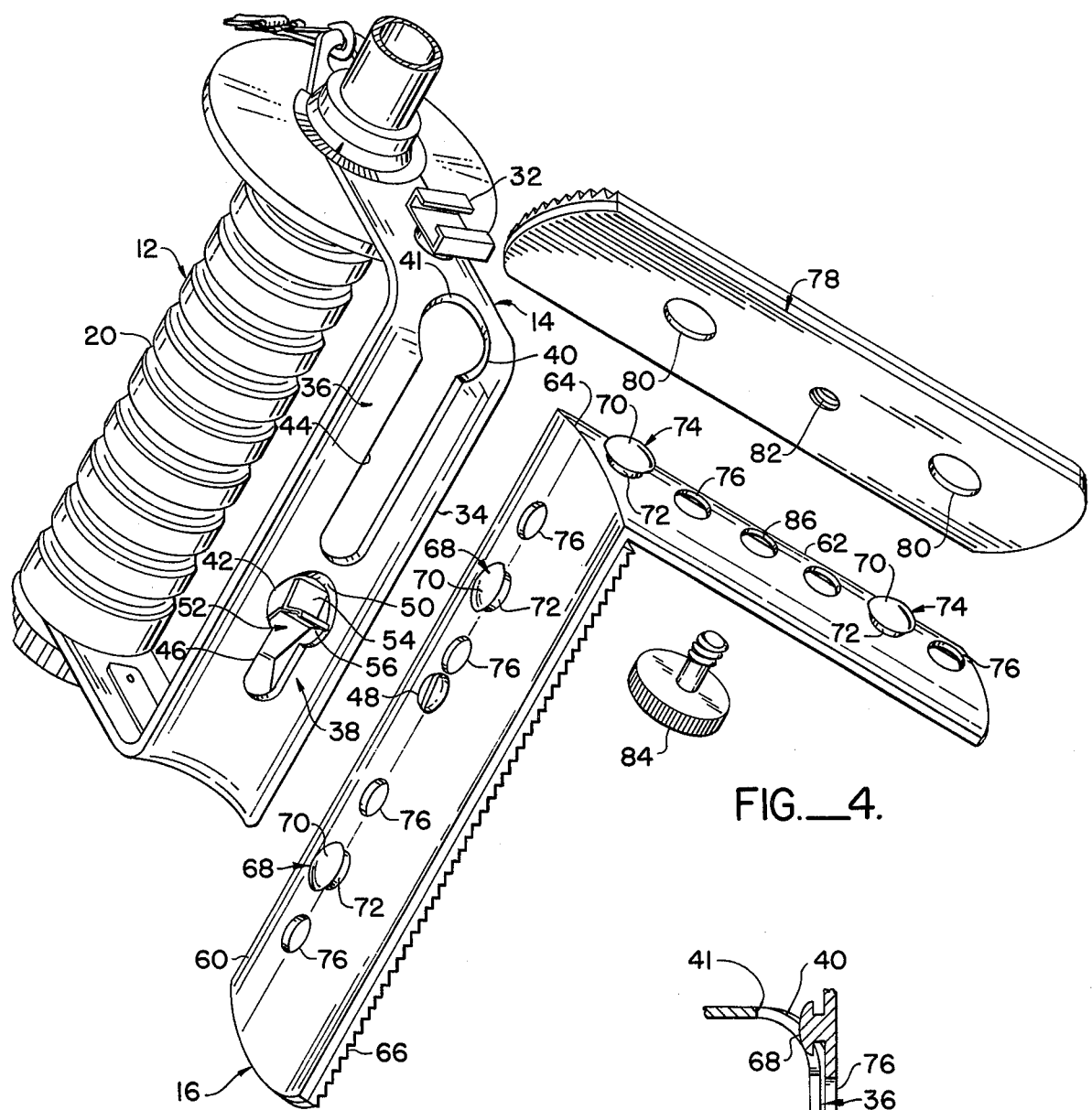
FIG._4.
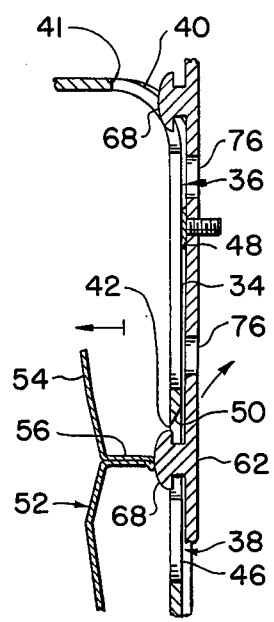
FIG._5.

CAMERA FLASH BRACKET

BACKGROUND OF THE INVENTIONS

This application is a continuation-in-part application of Patent Application Ser. No. 561,083, filed Apr. 17, 1975 now abandoned.

FIELD OF INVENTION

This invention relates to hand grips for cameras, and in particular describes a quick-release hand grip for mounting a rectangular format camera which permits support of one or more cameras in selected orientation with respect to an established lighting configuration, and further permits the mounting of one or more cameras on a monopod.

With a hand-held camera, it is difficult to maintain uniformity of control over lighting, support a camera rigidly and retain freedom of movement. For example, where the photographer need not concern himself with lighting level or direction, both horizontal and vertical format photographs can be quickly composed and taken at a suitably fast shutter speed. Conditions are seldom ideal, so a tripod or flash bar is generally employed. However, a tripod severely limits a photographer's freedom to move quickly from one place to another. Where a flash bar is securely attached to a camera or to its mount, vertical and horizontal format photographs cannot be taken in rapid succession without changing the lighting arrangement relative to the subject. Precious time may be lost while re-orienting the camera to a pre-selected lighting configuration established by camera flash mounting brackets of conventional design.

DESCRIPTION OF THE PRIOR ART

Pistol grips and other hand grips are well-known for aiding the photographer in the support of a hand-held camera. Flash attachments mounted to the camera are likewise well-known. Conventional flash attachments, tripods, and hand grips are generally mounted to the camera body. Most rectangular format 35 mm cameras, for example, are provided with a thread mount in the bottom wall of the camera body which mates with a standardized threaded screw. It is also well-known to provide a bracket for supporting a flash unit which permits the flash unit to pivot on a frictionally-securable joint between selected positions.

Conventional tripod design provides a head with a frictionally securable universal joint. Conventional frictionally secured mounts slip very easily, particularly under heavy loads. This can become very annoying to the photographer. Moreover, with the conventional tripod head construction, several seconds are required to loosen, release, reorient and firmly re-secure the camera or its accessories in each desired orientation or configuration. As a result, several seconds of valuable shooting time may be lost.

Efforts have been undertaken to satisfy some of the shortcomings of conventional designs. For example, U.S. Pat. No. 3,855,602, to Hoos describes one camera flash bracket having an arm which enables rapid positioning of a relatively small camera flash bracket between horizontal and vertical positions relative to the camera orientation. The invention described, however, appears to be limited to relatively small flash attachments mounted relatively close to the lens of a camera. A frictional pivot joint in the bracket arm which supports the flash attachment is ill-adapted to carry a substantial load. As a result, such a bracket is unlikely to enjoy general usage.

Efforts have also been made to provide quick attachment and detachment of a camera to a mounting platform such as a tripod. Sanderson U.S. Pat. No. 2,966,107 is an example thereof. In the Sanderson device, a pair of oppositely facing keyhole slots are provided in the base of a camera body, the larger ends of the slots being proximate. Each of the keyhole slots is adapted to receive a capped stud, each of which is riveted to an axially translatable bar. The studs are biased into the narrower or shank portions of the keyhole slots by a coil spring under compression. To remove the camera from its adaptor, it is first necessary that the mount be resting upon a tripod, thereby one hand is freed to press upon the depending portions for urging the studed heads to a release position in the two keyhole slots, while the other hand is used to remove the camera from the mount. This procedure is cumbersome. As a result, this type of mounting is ill-adapted to rapid change where mobility is important.

SUMMARY OF THE INVENTION

A camera grip according to the present invention comprises a bracket for supporting at least one camera, a handle for supporting accessories, and means for mounting the bracket to the handle such that the camera supporting bracket may be quickly secured to and released from the handle, and mounted in a plurality of configurations and orientations while fully supporting the camera and the grip in two hands. In the preferred embodiment the bracket-to-handle mounting means comprises a U-shaped strut having a relatively thin base plate and arm segments at each end of the base plate, for attachment at each of the opposing ends of the handle. The base plate is provided with a pair of longitudinal keyhole slots or apertures, each having an enlarged head aperture and a narrow shank. The top of the head aperture is either offset or the rim along the top edge is beveled. A latch is also provided for locking the base plate to the camera supporting bracket.

The camera supporting bracket comprises a pair of flat right-angle arm segments forming an L-shaped portion. Each segment is provided with a pair of capped studs on the outwardly disposed face. A camera may be secured on the opposite side in the crook of the elbow of the arm segments. The capped studs are spaced to mate and interlock in the keyhole slots. By means of the studs, the camera supporting bracket may be mounted to the base plate of the grip in at least two orientations, preferably at right angles to each other.

The grip may be employed in a number of configurations. For example, the grip may include a telescopic shaft for supporting flash bars or other attachments at any selected height above the grip. Alternatively, the grip is adapted to be supported upon a telescopic shaft operative as a monopod.

In the preferred embodiment, the handle portion of the grip includes a relatively thin, U-shaped base plate provided with keyholes and a latch, which is a hooked-end leaf spring attached to the inside of the strut with the hook biased to protrude through the head aperture of the keyhole. The latch also includes a finger tab accessible by the grip-supporting hand. The camera supporting bracket is generally an L-shaped member provided with the spaced studs on the outer face of each arm and includes depressions or apertures axially aligned adjacent the studs. Each is sufficiently large to accommodate the tongue of the biased latch. The L-shaped bracket is operative to slide readily into the keyhole slots and to be locked automatically by the bias latch as it confronts the depressions adjacent the studs. The L-shaped bracket is further operative to be quickly released by a simple motion of one finger of the grip-supporting hand, for releasing the latch to free the L-shaped bracket for sliding in the keyway slot. Further, as the capped studs slide toward the head of the keyhole slots, the cap is operative to encounter the bevel on the head, which urges the cap outwardly away form the U-shaped base plate, thereby freeing the camera from the hand grip.

These and other features of the invention will be more readily understood by reference to the following detailed description in conjunction with the accompanying drawings.

BRIEF DESCRIPTION OF THE DRAWINGS

FIG. 1 is a front-elevational view of the hand grip according to the invention with a camera in a first orientation;

FIG. 2 is a front-elevational view showing the camera of FIG. 1 in a second orientation;

FIG. 3 is a front-elevational view showing the hand grip of FIG. 1 in a further configuration for mounting a plurality of cameras;

FIG. 4 is an exploded view of the hand grip showing the handle and camera supporting bracket; and FIG. 5 is a vertical sectional view showing the interlocking mechanism.

DETAILED DESCRIPTION OF THE PREFERRED EMBODIMENT

Referring to the drawings in detail, there is shown in FIG. 1 a camera hand grip 10 comprising a handle 12, a strut 14 and a bracket 16 for supporting at least one camera 18 (shown in phantom) on the strut 14, which is bolted or otherwise permanently mounted to the handle 12. The strut 14 is adapted to releasably mount the bracket 16 and to support the bracket 16 in at least two positions: a first position with camera 18 oriented generally horizontally (as shown in FIG. 1) and in a second position wherein the camera 18 is oriented generally vertically (as shown in FIG. 2).

The handle 12 may comprise a hollow shaft with an outer covering 20 which may be ribbed with annular rings to provide for better grip. A telescopic shaft 22 may be mounted through the hollow shaft of handle 12 and retained in place by a threaded locking nut 24 coupling the end of telescopic shaft 22 to the end of handle 12. The telescopic shaft 22 may be used for supporting a flash attachment 26 (shown in phantom in FIG. 1) at any desired height above the handle. Alternatively, the telescopic shaft may be used as a monopod with an appropriate foot attachment (shown in phantom in FIG. 3). In addition, the telescopic shaft 22 may also include an auxiliary handle 30 therearound, which provides the user an alternative grip.

The hand grip 10 is also easily adapted to support more that one flash attachment, for example, a flash foot 32 may be riveted to a suitable location on base plate 14. Moreover, the hand grip according to the invention is readily adapted to support more than one camera (as by example shown in the illustrative configuration of FIG. 3). In all cases, the camera and the handle are readily attachable and detachable.

FIG. 4 illustrates in greater detail the particular features of the means for mounting the bracket 16 to base plate 14. The strut 14 is seen to comprise a relatively thin U-shaped member, the ends of which are mounted at the top and bottom of handle 12. The center section, or base plate 34, is disposed generally parallel to handle 12. Base plate 34 includes therein first and second keyhole slots 36 and 38, respectively. At one end of the keyholes are head apertures 40 and 42, respectively and narrower shank portion 44 and 46, respectively, (The shank 44 is shown to be longer than shank 46 for the purpose of accommodating a camera mounting screw 48 or the like on the confronting mounting bracket 16. If a mounting screw is not used or if such mounting screw is countersunk in the brackets, the length of shank 44 may be appropriately modified).

As shown in FIG. 5, the top 41 of head aperture 40 is shown to lie across the bend of base plate 34 in the end section of strut 14. As a result, the top of head 40 is offset. The top of head aperture 42 is beveled or countersunk to present a tapered surface 50 toward the outwardly facing side of base plate 14. Adjacent the second keyhole slot 38 is a latch 52 which comprises a relatively thin band of spring steel having adjacent one end a finger tab 54 and a hooked lip 56 which is disposed to protrude through the head aperture 42 with hooked lip 56 directed toward the keyhole shank 46.

The camera mounting bracket 16 is generally an L-shaped member having arms 60 and 62 which meet at an elbow 64. The bracket 16 is adapted to carry a camera in the crook of elbow 64 as shown in FIG. 1. A mounting screw 48 (FIG. 4) or the like firmly secures a camera to arm 60. A rubber pad 66 may be provided along the inside of arm 60 for the purpose of supporting the mounted camera.

The bracket 16 of the preferred embodiment includes a pair of capped studs 68 having domed caps 70 and necks 72 on the outer side of arm 60 and a pair of capped studs 74 on the outwardly facing side of arm 62. The distance between studs 68 is the same as the distance between studs 74. The distance is selected to match the distance between keyhole head apertures 40 and 42. Furthermore, the diameter of the caps 70 is selected to be smaller than the minimum diameter of both head apertures 40 and 42. However, the keyhole shanks 46 and 48 are chosen to be narrower than the stud caps 70 although broader than the stud necks 72. Thus, the studs 68 and 74 can engage keyhole slots 36 and 38 such that the keyhole shanks 44 and 46 slidably interlock therewith.

The bracket 16 is further provided with depressions or apertures 76 adjacent the studs 68 and 74 along the axis of arms 60 and 62. Each of the apertures 76 is spaced the same distance from the adjacent stud 68 or 74, and each is of sufficient size to accommodate the hooked lip 56 of latch 52. The distance between the studs and the aperture 76 is determined by the length of the mating shank, for example, shank 46. In practice, the lower stud 68 should rest at the base of shank 46 as the adjacent aperture 76 mates with latch lip 56, so that the strut 14 is firmly secured to the bracket 16.

A camera mount 78, comprising a straight rigid plate having indentations 80 and thread mount 82 along the axis of the plate may be provided optionally for mounting a second camera to bracket 16. The indentations 80 are spaced from one another the distance equal to the distance between capped studs 74. The indentations 80 are round apertures of sufficient diameter to receive the caps 70. The thread mount 82 mates with a mounting screw 84 through the face of an opening 86. Mount 78 may be placed against arm 62 such that the indentations 80 mate with studs 74 so that the arm 62 and the face of mount 78 substantially abut. Mounting screw 84 is inserted through aperture 86 and threaded through thread mount 82 into the base of a camera 19, as shown in FIG. 3 by way of example.

FIG. 4 in conjunction with FIG. 1 and FIG. 2 illustrates the use of the camera grip 10 for supporting and quickly changing the mounting orientation of a rectangular format camera 18. In FIG. 1, the camera 18 is shown to be mounted having its base along the inner face of arm 60. Studs 74 are locked into place on keyhole slots 36 and 38 (FIG. 4) and latch 52 is hooked into an adjacent aperture 76. To detach the bracket 16 from base plate 34, for the purpose of changing the angle of the camera 18 with respect to the handle 12, a finger (not shown) of a hand which grips the handle 12, extends to draw the tab 54 from the aperture 76, thereby freeing the bracket 16 to slide along keyhole slots 36 and 38.

As the bracket 16 slides up the keyhole slots 36 and 38, the cap 70 of the stud 68 in keyhole slot 38 encounters beveled surface 50 (as shown in FIG. 5). The beveled surface 50 thereupon directs the stud and thereby the bracket 16, outwardly from base plate 34 as the bracket 16 is urged further upward. The hooked lip 56 urges the stud, and thereby the bracket 16, outwardly away from the base plate 34 as the stud cap 70 attains the keyhole head 42.

At substantially the same point, the stud 68 in slot 36 attains the top 41 of head 40, which is offset away from the path of the studs. Further upward movement completely frees the arm 62 from base plate 34, permitting the camera user to rotate the camera 18 and its bracket 16 with one supporting hand to place the other arm 60 in facing relation to the base plate 34. The studs 68 are thereupon readily slid into keyhole slots 36 and 38 through the head apertures 40 and 42. The bracket 16 is then slid along the shanks 44 and 46 past the hooked lip 56 at which point the hooked lip 56 engages the opposing bracket depressions 76, thereby to lock the bracket 16 against base plate 34.

The strut 14 is typically subject to axial loading of up to several pounds. Therefore, strut 14 should be of an appropriately strong material such as a steel alloy. On the other hand, the bracket 16 and auxialiary camera mount 78, subject to less stress, might be constructed of other materials such as aluminum of the like.

The bracket 16 may also be a generally U-shaped member with another arm extending from the end of arm 60 or arm 62. Such an arm segment may also include studs and depressions for mating with base plate 34. A U-shaped member permits the common mounting of an auxiliary camera, for example, on auxiliary bracket 78, while retaining flexibility to rapidly change camera orientation relative to the handle 12.

Having described the structure and operation of the camera grip, many of the advantages wll be apparent. For example, the camera grip according to the invention allows quick reorientation of the format of a rectangular format camera. It also permits the mounting of multiple cameras in a fixed position relative to an established lighting configuration and fixed relative to one another.

This invention permits versatile and highly portable lighting arrangements. For example, a variety of flash attachments might be mounted at the end of the arm 22 which are adjusted to aim lighting in selected directions from selected heights above the camera.

Moreover, the camera grip according to this invention is readily adapted to a host of different configurations. For example several cameras can be mounted to the hand grip and held by one hand. The telescopic shaft 22 might be used as a monopod, which is much more portable than a tripod, yet provides adequate stability in many shooting situations.

In addition, still other advantages, uses and modifications will be obvious to one of ordinary skill in the art in view of this description. Therefore it is not intended that the invention be limited except as indicated by the appended claims.

I claim:

1. A camera grip comprising a handle supportable by one hand, having first interlocking means, a bracket for carrying at least one camera, said bracket having first and second transverse faces, each of the faces having second interlocking means mateable to said first interlocking means, said first interlocking means being slidably engageable with either of said second interlocking means in a manner maintaining said bracket and said handle in invariably fixed relative orientation, and latching means for quickly joining and separating the bracket and the handle whereby the bracket can be quickly separated from the handle to permit rapid reorientation of the camera.

2. A camera grip according to claim 1, wherein said interlocking means comprise a plate attached to said handle having keyways therein and capped studs mounted to said camera carrying bracket which studs interlockingly mate with said keyway.

3. A camera grip comprising a handle supportable by one hand having first interlocking means, a bracket for carrying at least one camera, said bracket having first and second transverse faces, each of the faces having second interlocking means mateable to said first interlocking means, said first interlocking means being slidably engageable with either of said second interlocking means, and means for quickly releasing the bracket from the handle with the grip supporting hand, wherein said releasing means comprises a biased latch mounted to said interlocking means and interlocking with said bracket, said latch being operable by a finger of the grip-supporting hand, whereby the bracket can be quickly separated from the handle to permit rapid reorientation of the camera.

4. A camera grip comprising a bracket having two transverse arms joined at an elbow and means for mounting a camera in the crook of the elbow, a handle normally disposed in a vertical configuration for carrying accessories, and means for interlocking the bracket and the handle, said interlocking means comprising a U-shaped strut attached at opposing ends to the handle and having a relatively thin central base plate, said base plate being provided with axial keyhole slots, each slot having an enlarged head aperture and a narrow shank, said bracket including at least two arms, each having at least a first pair of capped studs along the face of each arm, each said stud pair being spaced to mate with said keyhole slots, whereby said bracket is interlockable with said U-shaped strut in at least two slot-engaging configurations.

5. A camera grip according to claim 4, further including means for latching said bracket to said U-shaped strut in the slot-engaing configurations and for unlatching said bracket with a handle-supporting hand.

6. A camera grip according to claim 4, wherein the keyhole slots comprise an enlarged head and a narrower shank portion, and the top margin of said enlarged head aperture is beveled for engaging the caps of said studs and for urging the bracket outwardly from said base plate upon translation of the stud toward the top of said keyhole head aperture.

7. A camera grip according to claim 5, wherein the top of one of said head apertures is offset away from the path of said studs.

8. A camera grip according to claim 7, wherein said offset slot head is across one corner of said U-shaped bracket.

9. A camera grip according to claim 4, further comprising a latch for securing said bracket to said U-shaped strut, said latch comprising a leaf spring having a first free end and a second end secured to the inner side of said strut, said free end including a hook for engaging the capped studs of said bracket and a finger tab; said hook being biased to protrude through said head aperture and said finger tab being disposed convenient to the location of the fingers of a hand grasping said handle, for permitting a finger to conveniently withdraw said hooked end from said head aperture to unlatch a slot interlocked camera bracket.

10. A camera grip comprising a planar L-shaped bracket which comprises a pair of transverse arms with a pair of capped studs mounted along each of the outwardly disposed arm faces, a plurality of apertures along the arm faces adjacent the capped studs and means for mounting a camera to at least one of the inwardly disposed arm faces; a tubular handle including a telescopic shaft attached through the tubular handle adapted for carrying accessories and also adapted for supporting the handle as a monopod; a rigid U-shaped strut fastened at opposing ends of said handle, and capable of supporting the load of said bracket said strut comprising a relatively thin central base plate disposed generally parallel to said handle, a pair axially aligned keyhole slots each defining a shank and an enlarged head opening, the shank of the first slot being disposed adjacent the head opening of the second slot, said keyhole slots being spaced to receive and interlock with said capped studs in a first bracket configuration and a second bracket configuration perpendicular to the first configuration; a leaf spring latch having a first end secured to said strut on the side adjacent said handle and a second free end disposed opposing one of said head openings, said latch including at its free end a finger tab accessible to a finger of a handle grip supporting hand and a hook end protrusion extending toward said head opening with the hook end bent toward the shank of the keyhole, said leaf spring latch being biased to engage one of said bracket apertures upon engagement of said keyhole slot and capped studs and which is operative to free said stud for release of said bracket upon withdrawal of said finger tab toward said handle removing said protrusion from said aperture.

11. A camera grip according to claim 10, wherein said shank opposing the margin of the keyhole slot adjacent the leaf spring latch is beveled to provide a slanted face for urging a slot engaging capped stud and thereby said camera supporting bracket outwardly from said strut upon translation of said stud toward said margin.

* * * * *